United States Patent [19]
Katagishi et al.

[11] Patent Number: 5,172,154
[45] Date of Patent: Dec. 15, 1992

[54] SYSTEM CAMERA

[75] Inventors: Yuichi Katagishi, Yokohama; Yoshiharu Shiokama, Kawasaki; Yoshinari Hamanishi, Wako, all of Japan

[73] Assignee: Nikon Corporation, Tokyo, Japan

[21] Appl. No.: 740,418

[22] Filed: Aug. 5, 1991

[30] Foreign Application Priority Data

Aug. 6, 1990 [JP] Japan .................. 2-206874

[51] Int. Cl.$^5$ .................. G03B 13/36; G03B 7/20
[52] U.S. Cl. .................. 354/402; 354/286
[58] Field of Search .............. 354/400, 402, 403, 286, 354/408, 407, 406, 432

[56] References Cited

U.S. PATENT DOCUMENTS

| | | | |
|---|---|---|---|
| 4,687,917 | 8/1987 | Kusaka et al. | 354/408 X |
| 4,812,868 | 3/1989 | Utagawa et al. | 354/402 |
| 4,816,663 | 3/1989 | Utagawa et al. | 354/402 X |
| 4,833,498 | 5/1989 | Kato et al. | 354/286 X |
| 4,835,561 | 5/1989 | Matsui | 354/403 |
| 4,890,133 | 12/1989 | Ogawa et al. | 354/402 |
| 4,908,505 | 3/1990 | Taniguchi et al. | 354/406 X |
| 4,912,493 | 3/1990 | Tanaka | 354/400 |
| 4,935,760 | 6/1990 | Kojima | 354/286 |
| 4,985,726 | 1/1991 | Fujibayashi et al. | 354/432 |
| 5,012,268 | 4/1991 | Hirai et al. | 354/286 X |

FOREIGN PATENT DOCUMENTS

| | | |
|---|---|---|
| 41-12429 | 7/1966 | Japan . |
| 54-104859 | 8/1979 | Japan . |
| 57-49841 | 10/1982 | Japan . |
| 57-210326 | 12/1982 | Japan . |
| 59-208514 | 11/1984 | Japan . |
| 60-86517 | 5/1985 | Japan . |
| 62-86337 | 4/1987 | Japan . |
| 62-227108 | 10/1987 | Japan . |
| 62-229213 | 10/1987 | Japan . |
| 1-109331 | 4/1989 | Japan . |
| 3-7906 | 1/1991 | Japan ........................ 354/286 |

Primary Examiner—W. B. Perkey
Attorney, Agent, or Firm—Shapiro and Shapiro

[57] ABSTRACT

A system camera provided with a rear conversion lens barrel interposed between an interchangeable phototaking lens barrel and a camera body comprises a camera body having a focus detecting apparatus for detecting the amount of deviation of the image plane and a first converting device for correcting the amount of deviation of the image plane detected by the focus detecting apparatus, an interchangeable photo-taking lens barrel disposed forwardly of the camera body and having an interchangeable photo-taking lens and a first memory for storing therein data regarding the exit pupil position PO from the focal plane of the interchangeable photo-taking lens, a rear conversion lens barrel interposed between the interchangeable phototaking lens barrel and the camera body and having a rear conversion lens and a second memory for storing therein data regarding the magnification $\beta_R$ and focal length $f_R$ of the rear conversion lens, and a second converting device for reading the data of the first and second memories and calculating the combined exit pupil position PO' from the focal plane of the combined system of the rear conversion lens and the interchangeable photo-taking lens from the equation that $$1/PO' = 1/(PO \times \beta_R^2) - 1/(f_R \times \beta_R),$$

and the second converting device is connected to the first converting device and can output the calculated combined exit pupil position PO' to the first converting device.

15 Claims, 8 Drawing Sheets

FIG. 4

| FIG. 4 |
|---|
| FIG. 4A |
| FIG. 4B |
| FIG. 4C |

FIG. 4A

TELE CONVERSION LENS $\Delta DR_R$ : −0.08551    $\beta_R$ : 1.43

INTERCHANGEABLE LENS BARREL 1

| | $\Delta DR_1$ | $\Delta DR$ (APPROXIMATE FORMULA) | $\Delta DR$ (ACTUALITY) | $\lvert \Delta DR - \Delta DR \rvert$ (ACTUALITY) (APPROXIMATE FORMULA) |
|---|---|---|---|---|
| INFINITY | 0.20558 | 0.33488 | 0.33471 | 0.00017 |
| MIDDLE | 0.21898 | 0.36228 | 0.36219 | 0.00005 |
| MINIMUM FOCUSING | 0.27051 | 0.46766 | 0.46795 | 0.00029 |

FIG. 4B

INTERCHANGEABLE LENS BARREL 2

|  |  | $\Delta DR_1$ | $\Delta DR$ (APPROXIMATE FORMULA) | $\Delta DR$ (ACTUALITY) | $|\Delta DR$ (APPROXIMATE FORMULA) $- \Delta DR|$ (ACTUALITY) |
|---|---|---|---|---|---|
| WIDE | INFINITY | 0.28292 | 0.49303 | 0.49344 | 0.00041 |
|  | MIDDLE | 0.29230 | 0.51221 | 0.51272 | 0.00090 |
|  | MINIMUM FOCUSING | 0.31438 | 0.55737 | 0.55812 | 0.00135 |
| MIDDLE | INFINITY | 0.32672 | 0.58260 | 0.58350 | 0.00051 |
|  | MIDDLE | 0.34028 | 0.61033 | 0.61141 | 0.00108 |
|  | MINIMUM FOCUSING | 0.39132 | 0.71470 | 0.71653 | 0.00161 |
| TELE | INFINITY | 0.35909 | 0.64879 | 0.65014 | 0.00075 |
|  | MIDDLE | 0.37704 | 0.68550 | 0.68711 | 0.00183 |
|  | MINIMUM FOCUSING | 0.47121 | 0.87807 | 0.88140 | 0.00333 |

FIG. 4C

INTERCHANGEABLE LENS BARREL 3

| | $\Delta DR_1$ | $\Delta DR$ (APPROXIMATE FORMULA) | $\Delta DR$ (ACTUALITY) | $|\Delta DR - \Delta DR|$ (APPROXIMATE FORMULA) (ACTUALITY) |
|---|---|---|---|---|
| INFINITY | 0.34493 | 0.61984 | 0.62097 | 0.00113 |
| MIDDLE | 0.36256 | 0.65589 | 0.65727 | 0.00138 |
| MINIMUM FOCUSING | 0.42468 | 0.78292 | 0.78533 | 0.00241 |

UNITS OF $\Delta DR_R$, $\Delta DR_1$ AND $\Delta DR$ ARE MILLIMETERS.

SYSTEM CAMERA

BACKGROUND OF THE INVENTION

1. Field of the Invention

This invention relates to a system camera provided with a rear conversion lens barrel interposed between an interchangeable photo-taking lens barrel and a camera body.

2. Related Background Art

As a focus detecting apparatus in a TTL camera, there is known an automatic focus detecting apparatus of the so-called pupil division type which detects the focus adjusted state of a photo-taking optical system from the amount of relative deviation of a plurality of object images formed by light beams coming from different areas of the pupil of the photo-taking optical system.

For example, Japanese Patent Publication No. 57-49841 discloses an automatic focus detecting apparatus of this type which is constituted by a pair of arrays, i.e., a lens array disposed near the primary image plane and a light receiving element array disposed immediately rearwardly thereof.

Also, Japanese Laid-Open Patent Application No 54-104859 discloses an automatic focus detecting apparatus of this type which is constituted by a field lens disposed on the primary image plane, two re-imaging lenses for re-imaging an image formed on the primary image plane on the secondary image plane, and two image sensor arrays disposed on the secondary image plate.

However, such automatic focus detecting apparatuses of the pupil division type according to the prior art have suffered from the disadvantage as will hereinafter be described.

In the automatic focus detecting apparatus of this type, the pupil of a predetermined F number is specified on a place orthogonal to a predetermined position on the optical axis by an optical system on the focus detection side and therefore, even if the F number of the exit pupil is an F number great as compared with a predetermined F number, or the F number of the exit pupil is the same F number as said predetermined F number, or is an F number small as compared with said predetermined F number, when an interchangeable photo-taking lens in which the position of the exit pupil from said predetermined position is mounted on a camera body having said automatic focus detecting apparatus, eclipse may sometimes be caused in a focus detecting light beam by the position of the exit pupil, and when the eclipse becomes non-uniform on the image plane on the focus detecting optical system side, distortion is formed in the balance between the quantities of light of the object images and thus, it has been impossible to accomplish accurate focus detection.

To overcome such a disadvantage, Japanese Laid-Open Patent Application No. 60-86517 discloses a focus detecting apparatus provided with eclipsed state detecting means for detecting the eclipsed state of an image formed by a focus detecting optical system, by a pair of outputs put out from an image sensor, and outputting a signal corresponding to that state.

In such a system, the eclipsed state is directly found from the outputs of the image sensor and therefore, the eclipsed state can be detected highly accurately for objects which satisfy special conditions as when the objects are uniformly approximate to intensity of illumination.

However, when an object has a complicated luminance distribution, the pattern of the outputs of the image sensor is also complicated and moreover, the image position regarding the pair of image outputs differs depending on the defocus amount and therefore, the eclipsed state has not always been detected accurately even if various contrivances have been made.

So, in Japanese Laid-Open Patent Application No. 62-229213, attention is paid to the relation between eclipse and the position of the exit pupil of a photo-taking optical system, and information regarding said exit pupil is stored in memory means contained in an interchangeable photo-taking lens, and this information is read on the body side as required and the amount of eclipse is estimated, whereby an accurate amount of eclipse is grasped irrespective of objects to thereby enhance the accuracy of focus detection.

Also, as a countermeasure for any exposure error caused by a lens mounted on a lens interchange type camera in which light from an object incident through a photo-taking lens is received by the light receiving portion of an exposure meter and the degree of exposure is measured, Japanese Patent Publication No. 41-12429, Japanese Laid-Open Patent Application No. 62-86337 and Japanese Laid-Open Patent Application No. 1-109331 make it possible to transmit the information of the position of the exit pupil of the interchangeable lens to the camera body and correct exposure to thereby obtain accurate exposure.

On the other hand, there is also known a focus detecting apparatus in which a defocus amount output from defocus amount detecting means is corrected in conformity with the spherical aberration of an imaging optical system and the best focus position is determined.

For example, Japanese Laid-Open Patent Application No. 57-210326 discloses a system in which a signal for identifying the type of a photo-taking lens provided in an interchangeable lens barrel is read on the camera body side, whereby the type of spherical aberration is identified and correction is effected by corresponding spherical aberration data. This intends to correct the amount of out-of-focus with the F-value used in photographing being also taken into account.

In this case, however, a memory device for making the amount of correction of the best image plane position to correspond from the types of aberrations and the F-value used in photographing is contained in the camera body and when an attempt is made to effect fine correction, the types of aberrations differ from one photo-taking lens to another and also, in a zoom lens, the types of aberrations differ in the zoom position and therefore, the number of types becomes huge, and this has led to the disadvantage that an amount of memory which cannot be coped with by only the memory device in the camera body in both of cost and capacity becomes necessary.

There has also been the disadvantage that the types of the aberrations of a photo-taking lens developed after the manufacture of the camera body cannot be coped with if they do not belong to any former types.

A focus detecting apparatus of this type is also disclosed in Japanese Laid-Open Patent Application No 59-208514.

This has the merit that whatever types of aberrations of a photo-taking lens developed after the sale of the camera body can be coped with, while the amount of correction contained in the photo-taking lens side is determined on the premise that a focus detecting apparatus having a particular aperture-corresponding F-value is contained in the camera body. Accordingly, this has led to the disadvantage that where the aperture-corresponding F-value of a focus detecting apparatus developed later differs from that of a formerly developed focus detecting apparatus, the amount of correction contained in the lens cannot be applied to such detecting apparatus.

There has also been the disadvantage that a case where the focus detecting apparatus contained in the camera body has a plurality of aperture-corresponding F-values cannot be coped with.

The focus detecting apparatus disclosed in the aforementioned Japanese Laid-Open Patent Application No. 57-210326 is free from such disadvantages, because the memory means for the amount of correction is on the body side and when the aperture-corresponding F-value of the focus detecting apparatus contained in the camera body changes, the content of the memory means can be changed correspondingly thereto.

The aberration correction system of the above-described focus detecting apparatus also has the disadvantage that it cannot cope with one of a lens which will be put on sale in the future and a camera body containing therein a focus detecting apparatus which will be developed in the future.

To overcome these disadvantages, Japanese Laid-Open Patent Application No. 62-227108 provides a correction system which can correct aberrations by providing in a removably mountable photo-taking lens a means for storing therein two or more independent data expressive of the characteristics of the aberrations of the photo-taking lens whatever may be a lens which will be developed in the future or a focus detecting apparatus contained in a camera body which will be developed in the future.

As will be seen from the above-mentioned publications, the information regarding the exit pupil position and aberrations of the photo-taking lens is indispensable in accurate focus detection, and the information regarding the exit pupil position of the photo-taking lens is indispensable in accurate exposure.

Now, in a system camera provided with the focus detecting apparatus disclosed in the aforementioned Japanese Laid-Open Patent Application No. 62-229213 or Japanese Laid-Open Patent Application No. 62-227108, where a rear conversion lens is interposed between an interchangeable photo-taking lens barrel and a camera body, information regarding only the interchangeable lens is read on the body side in spite of the fact that data required by the camera body side is information regarding the exit pupil position and aberrations in a state in which the interchangeable photo-taking lens barrel and the rear conversion lens are made into a single optical system, and this has led to the problem that desired information cannot be obtained and this information difference provides an error in focus detection and the accuracy of focus detection is remarkably reduced.

The system cameras disclosed in Japanese Patent Publication No. 41-12429, Japanese Laid-Open Patent Application No. 62-86337 and Japanese Laid-Open Patent Application No. 1-109331 have also suffered from the problem that exposure accuracy is likewise remarkably reduced by information difference.

Further, in the system cameras according to the prior art, with the interchangeable photo-taking lens and the rear conversion lens as a single optical system, the necessity of storing all information regarding the combination of various interchangeable photo-taking lenses and the rear conversion lens has arisen, and this has led to the problem that data memory capacity becomes great and cost increases.

SUMMARY OF THE INVENTION

The present invention has been made in view of such circumstances and provides a system camera which can enhance the accuracy of focus detection and can also enhance exposure accuracy when exit pupil information is used and which can achieve a reduction in cost.

The system camera according to the present invention is such that with a rear conversion lens and an interchangeable photo-taking lens as a single optical system, a first converting device for detecting the focus and correcting the amount of image plane deviation has connected thereto a second converting device for reading the data of two memory means and calculating the combined exit pupil position PO' (the exit pupil position PO of the interchangeable photo-taking lens, the magnification $\beta_R$ of the rear conversion lens and the focal length $f_R$ of the rear conversion lens) from the following equation:

$$1/PO' = 1/(PO \times \beta_R^2) - 1/(f_R \times \beta_R)$$

Also, the system camera according to the present invention is such that with a rear conversion lens and an interchangeable photo-taking lens as a single optical system, a first converting device for detecting the focus and correcting the amount of image plane deviation has connected thereto a second converting device for reading the data of two memory means and calculating the combined best image plane and/or the combined aberration state $\Delta DR$ (the best image plane and/or the aberration state $\Delta DR_1$ of the interchangeable photo-taking lens, the magnification $\beta_R$ of the rear conversion lens and the best image plane and/or the aberration state $DR_R$ of the rear conversion lens) from the following equation:

$$\Delta DR = \Delta DR_1 \times \beta_R^2 + \Delta DR_R.$$

In the present invention, the combined exit pupil position can be found with the interchangeable lens and the rear conversion lens as a single optical system and accurate focus detection and/or exposure can be accomplished.

Also, in the present invention, the combined best image plane and/or the combined aberration state can be found with the interchangeable photo-taking lens and the rear conversion lens as a single optical system and accurate focus detection can be accomplished.

BRIEF DESCRIPTION OF THE DRAWINGS

FIG. 4 comprising FIGS. 4A-4C shows the result of a calculation in which the amounts of aberration by the use of interchangeable photo-taking lenses and a rear conversion lens has been corrected.

DETAILED DESCRIPTION OF THE PREFERRED EMBODIMENTS

Figure 1:
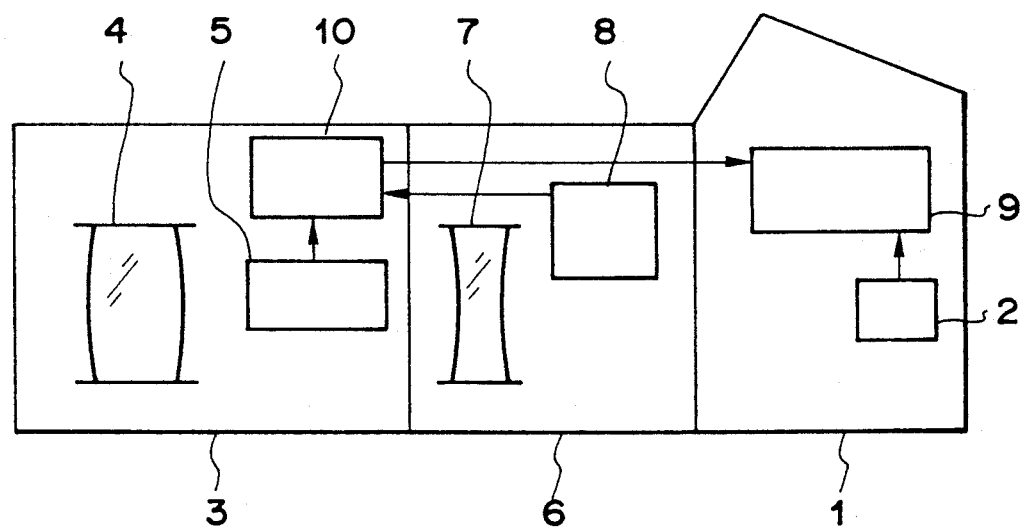
FIG. 1 shows the principle of an embodiment in which a system camera according to the present invention is applied to an auto focus camera system.

The construction of the present invention will hereinafter be described with respect to some embodiments shown in the drawings.

FIG. 1 shows the principle of an embodiment in which a system camera according to the present invention is applied to an auto focus camera system. In Figure, a camera body designated by the reference numeral 1 contains therein a focus detecting apparatus 2 for detecting the amount of deviation of the image plane. The reference numeral 3 denotes an interchangeable photo-taking lens barrel containing an interchangeable photo-taking lens unit 4 therein. The interchangeable photo-taking lens barrel 3 is desposed forwardly of the camera body 1. This interchangeable photo-taking lens barrel 3 contains therein an information memory device 5 as first memory means for storing therein data regarding the exit pupil position PO and aberration state $\Delta DR_1$ (and/or the best image plane) of the interchangeable photo-taking lens unit 4. The reference numeral 6 designates a rear conversion lens barrel containing a rear conversion lens unit 7 therein and interposed between the camera body 1 and the interchangeable photo-taking lens barrel 3. This rear conversion lens barrel 6 contains therein an information memory device 8 as second memory means for storing therein data regarding the aberration state $\Delta DR_R$ (and/or the best image plane), magnification $\beta_R$ and focal length $f_R$ of the rear conversion lens unit 7. The reference numeral 9 denotes a first converting device contained in the camera body 1 and designed to read the aberration state $\Delta DR$ which is the input data from a second converting device to be described (and/or the combined best image plane) and the exit pupil position PO', and correct the amount of deviation of the image plane detected by the focus detecting apparatus 2 and calculate an accurate amount of deviation of the image plane. The reference numeral 10 designates a second converting device contained in the interchangeable photo-taking lens barrel 3 and connected to the first converting device 9, and designed to read the data of the two information memory devices 5 and 8 with the interchangeable photo-taking lens barrel 3 and the rear conversion lens barrel 6 as a single optical system, and calculate the combined aberration state $\Delta DR$ (and/or the combined best image plane) and the combined exit pupil position PO' from the following equations:

$$1/PO' = 1/(PO \times \beta_R^2) - 1/(f_R \times \beta_R)$$

and $$\Delta DR = \Delta DR_1 \times \beta_R^2 + \Delta DR_R.$$

In the system camera thus constructed, when the converting device 10 in the interchangeable photo-taking lens barrel 3 reads the exit pupil position PO and aberration state $\Delta DR_1$ (and/or the best image plane) of the interchangeable photo-taking lens unit from the information memory device 5 and further reads the information of the aberration state $\Delta DR_R$ (and/or the best image plane), magnification $\beta_R$ and focal length $f_R$ from the information memory device 8, the combined exit pupil position PO' and combined aberration state $\Delta DR$ (and/or the best image plane) of the interchangeable lens unit 4 and the rear conversion lens unit 7 are calculated from the aforementioned two equations and transmitted to the converting device 9 in the camera body 1. Then, the converting device 9 corrects the amount of deviation of the image plane from the focus detecting apparatus 2 by the data of the combined exit pupil position PO' and the combined aberration state $\Delta DR$ and converts it into an accurate amount of deviation of the image plane.

Also, the combined exit pupil position PO' obtained by the converting device 10 is read by an exposure control device (not shown) in the camera body 1 and used as correction data for obtaining accurate exposure.

Accordingly, in the present embodiment, the combined exit pupil position and combined best image plane and/or the combined aberration state of the combined system of the interchangeable photo-taking lens unit 4 and the rear conversion lens unit 7 are found by calculation, whereby accurate focus detection and exposure can be accomplished.

Also, in the present embodiment, the fact that the aberration state $\Delta DR$ and exit pupil position PO' of the combined system of the interchangeable photo-taking lens unit 4 and the rear conversion lens unit 7 are found by calculation means that it is not necessary to store all aberration state $\Delta DR$ and exit pupil positions PO' of the combinations of various interchangeable photo-taking lenses and the rear conversion lens as information and therefore, the memory capacity for data can be greatly reduced.

In the present embodiment, when the rear conversion lens barrel 6 is not used, the data of the exit pupil position PO and aberration state $\Delta DR_1$ of the interchangeable photo-taking lens barrel 3, instead of the exit pupil position PO' and aberration state $\Delta DR$, are intactly transmitted to the converting device 10.

Description will now be made of the fact that the exit pupil position PO' and aberration state $\Delta DR$ of the combined optical system in the present invention are found by calculation.

Figure 2:
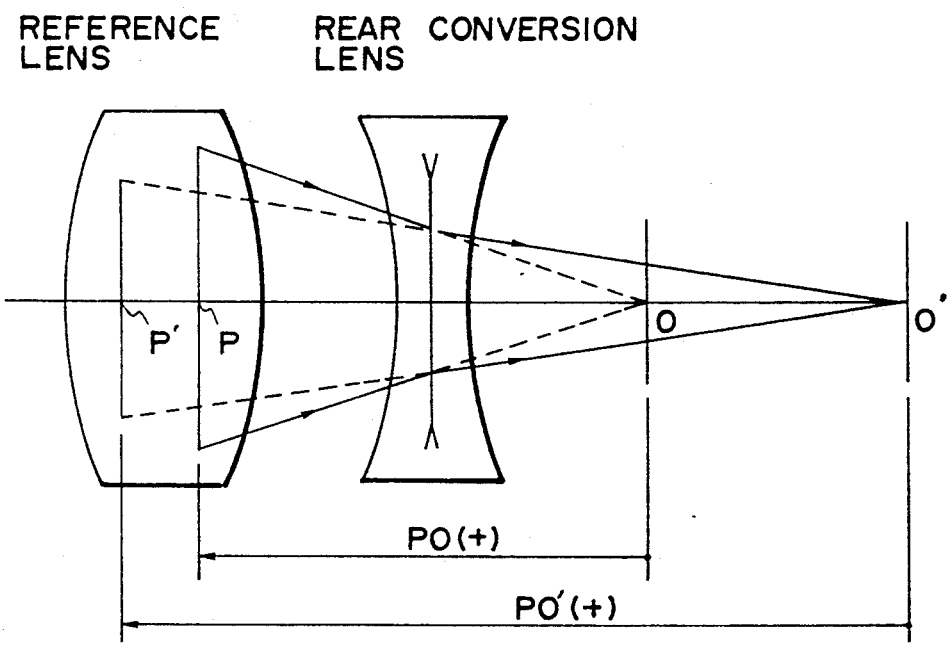
FIG. 2 shows the imaged state when a rear conversion lens is mounted on an interchangeable photo-taking lens.

FIG. 2 shows the imaged state when the rear conversion lens is mounted on the interchangeable photo-taking lens as a reference lens, and the object point O and image point O' of the rear conversion lens are chosen as origins. These two origins are conjugate points, and the lateral magnification thereof is equal to the magnification $\beta_R$ of the rear conversion lens. As any conjugate points, for example, the exit pupil position PO (the exit pupil position P of the interchangeable photo-taking lens) and the exit pupil position PO' (the exit pupil position P' when the interchangeable photo-taking lens and the conversion lens are made into a single optical system) are newly regarded as the object point P and the image point P', respectively, and when the focal length of the rear conversion lens is $f_R$, the imaging equation in which with respect to these points, the point O and the point O' are origins is $$-\beta_R/PO' + 1/(\beta_R \times PO) = 1/f_R.$$

By modifying this, the exit pupil position PO' in a state in which the interchangeable photo-taking lens 3 and the rear conversion lens 7 are made into a single optical system can be calculated from $$1/PO' = 1/(PO \times \beta_R^2) - 1/(f_R \times \beta_R). \quad (1)$$

Figure 3A:
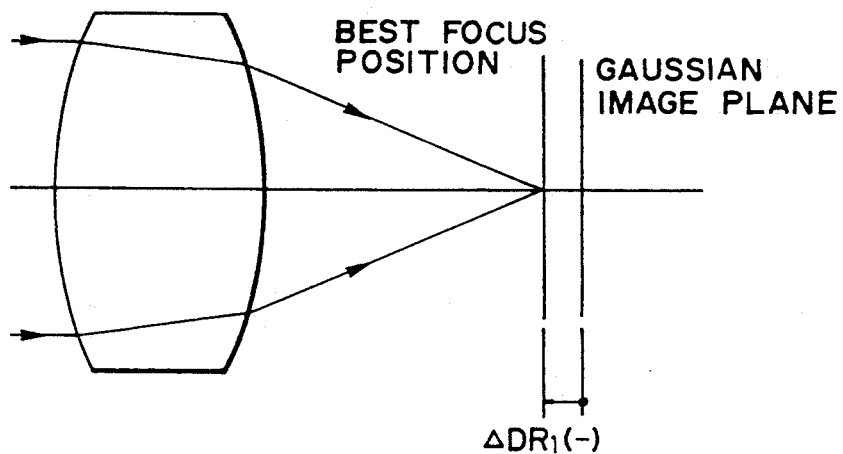
FIGS. 3A–3C show the aberration states to a light beam having a particular effective F-value.
Figure 3B:
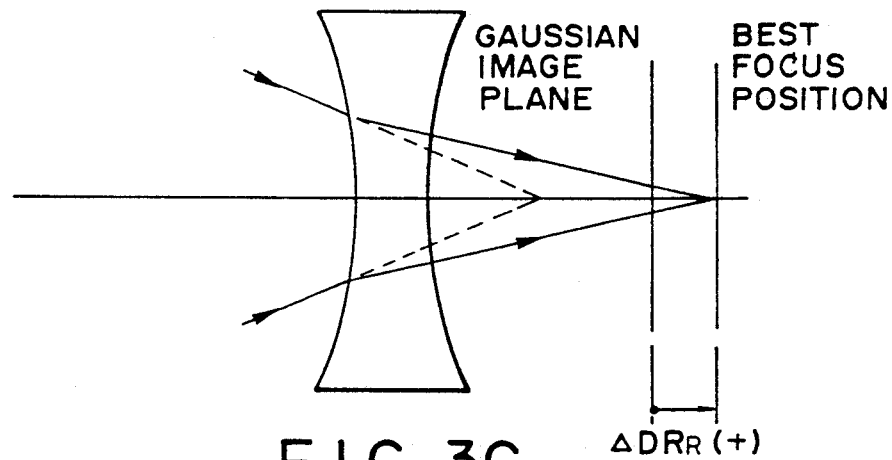
Figure 3C:
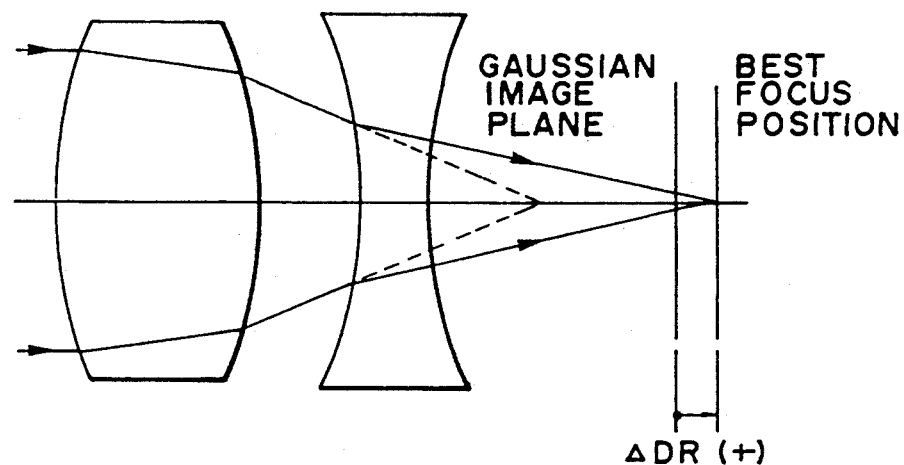

FIGS. 3A–3C show the positions of the best image plane relative to a light beam having a particular effective F-value by the aberration states of the interchangeable photo-taking lens and the rear conversion lens and when the rear conversion lens is mounted on the photo-taking lens. The aberration states herein are the amounts of deviation from a particular reference image plane, e.g. the Gaussian image plane, to the best image plane determined by the effective F number, MTF, etc. and the best image plane by the remaining spherical aberration, and the correction of these aberration states is possible in conformity with the purpose by choosing any one aberration state from among monochromatic, white and infrared aberration states. When the aberration state of the interchangeable photo-taking lens shown in FIG. 3A is $\Delta DR_1$ and the aberration state and magnification of the rear conversion lens shown in FIG. 3B are $\Delta DR_R$ and $\beta_R$, respectively, the aberration state $\Delta DR$ when the interchangeable photo-taking lens and the rear conversion lens shown in FIG. 3C are regarded as a single optical system can be approximated by the following equation $$\Delta DR = \Delta DR_1 \times \beta_R^2 + \Delta DR_R. \quad (2)$$

This equation (2) becomes the following equation when it is taken into consideration that it depends on the F number $F_1$ of the interchangeable photo-taking lens:

$$\Delta DR(F) = \Delta DR_1(F_1) \times \beta_R^2 + \Delta DR_R(F_R). \quad (3)$$

In this equation, F is a combined F number which is $F = F_1 \times \beta_R$, and $F_R$ is a parameter which determines the actually utilized central light beam in the rear conversion lens. Also, the aberration state $\Delta DR_R(F_R)$ of the rear conversion lens depends on $F_1$ of the photo-taking lens, and is desirably determined by a light beam of $F_R = F_1$. Usually, however, interchangeable photo-taking lenses differing in the value of $F_1$ are used and therefore, it is necessary for the rear conversion lens to pre-store therein a number of aberration states $\Delta DR_R(F_R)$ as sample data in connection with $F_1$ and correspondingly to a number of values of $F_R$. The aberration state $\Delta DR_R(F_R)$ sampled at the same value as the value of $F_1$ of the interchangeable photo-taking lens or the value of $F_R$ most approximate to this value is taken out of the memory device and is calculated from the above-mentioned equation (3), and the correction of the combined aberration state $\Delta DR$ is effected.

The table shown in FIG. 4 is the result of a calculation in which the amount of on-axis chromatic aberration of the line A' by three kinds of interchangeable photo-taking lenses and one kind of rear conversion lens has been corrected.

As will be seen from this table, $\Delta DR$ calculated from the above-mentioned approximate expression is well approximated to the actual $\Delta DR$ with a difference of several microns or less, and the effectiveness of the above-mentioned approximate expression will be clear.

Figure 5:
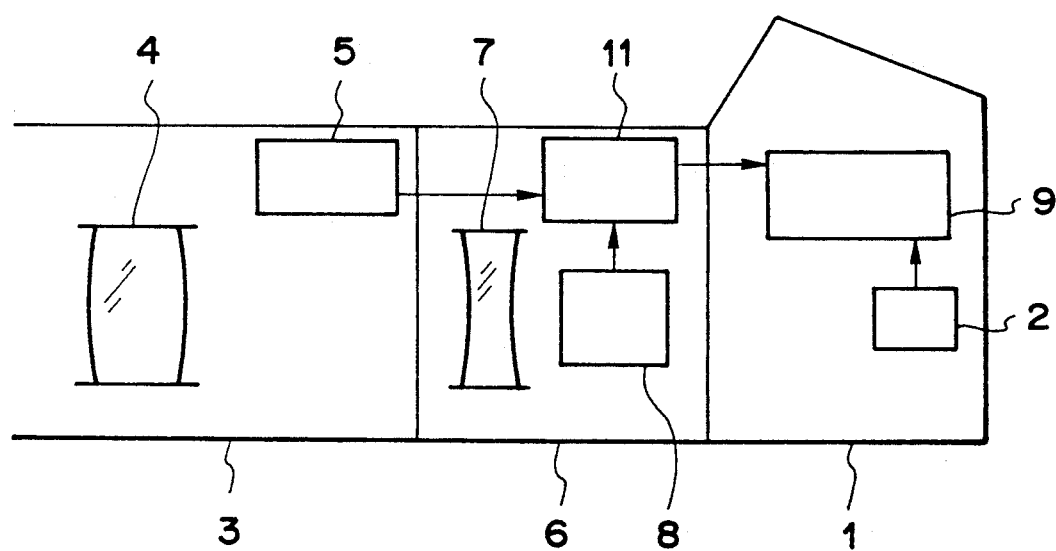
FIG. 5 shows the principle of a second embodiment.
Figure 6:
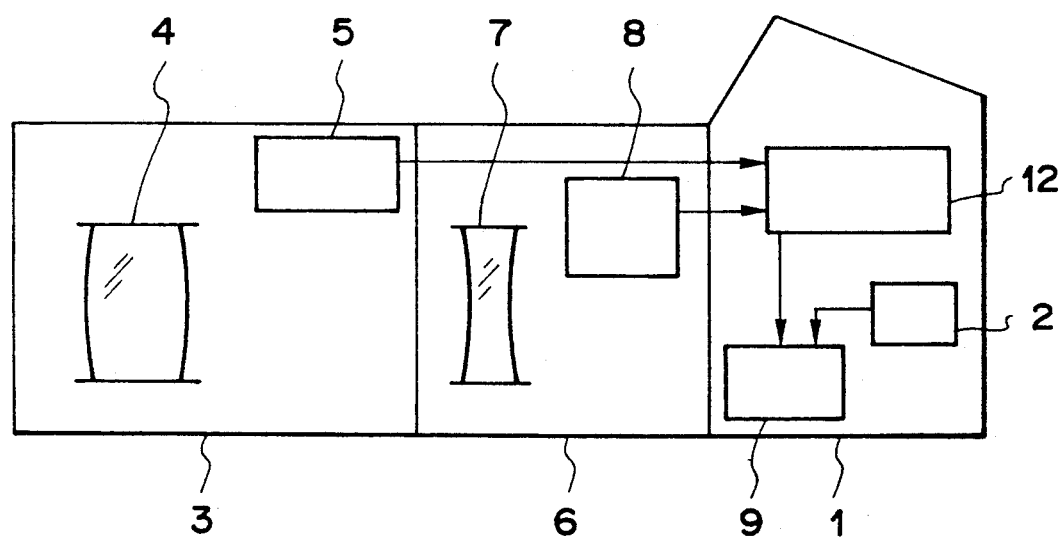
FIG. 6 shows the principle of a third embodiment.

In the present embodiment, there has been shown a case where the second converting device 10 for calculating the aberration state $\Delta DR$ and the exit pupil position PO' is contained in the interchangeable photo-taking lens barrel 3, whereas the present invention is not restricted thereto, but a second converting device 11 may be in the rear conversion lens barrel 6, as shown in FIG. 5, or a second converting device 12 may be contained in the camera body 1, as shown in FIG. 6, to thereby achieve an effect similar to that of the above-described embodiment.

In such cases, the data of the exit pupil position PO and aberration state $\Delta DR_1$ of the interchangeable photo-taking lens barrel 3 and the aberration state $\Delta DR_R$, magnification $\beta_R$ and focal length $f_R$ of the rear conversion lens barrel 6 are transmitted to the converting device 11 in the rear conversion lens barrel 6 or the converting device 12 in the camera body 1.

The exit pupil position is used not only in an auto focus camera system but also in an auto exposure camera system (for example, Japanese Patent Publication No. 41-12429, Japanese Laid-Open Patent Application No. 62-86337 and Japanese Laid-Open Patent Application No. 1-109331). Accordingly, the system camera according to the present invention can also be applied to an auto exposure camera system.

As described above, according to the present invention, the first converting device for correcting the amount of deviation of the image plane has connected thereto the second converting device for reading the data of the memory means with the rear conversion lens barrel and the interchangeable photo-taking lens barrel as a single optical system, and calculating the combined exit pupil position PO' (the exit pupil position PO of the interchangeable photo-taking lens, the magnification $\beta_R$ of the rear conversion lens and the focal length $f_R$ of the rear conversion lens) from the equation that $$1/PO' = 1/(PO \times \beta_R^2) - 1/(f_R \times \beta_R),$$

and the first converting device for correcting the amount of deviation of the image plane by the detection of the focus has connected thereto the second converting device for reading the data of the two memory means with the rear conversion lens and the interchangeable photo-taking lens as a single optical system, and calculation the combined best image plane and/or the combined aberration state $\Delta DR$ (the best image plane and/or the aberration state $\Delta DR_1$ of the interchangeable photo-taking lens, the magnification $\beta_R$ of the rear conversion lens and the best image plane and/or the aberration state $\Delta DR_R$ of the rear conversion lens) from the equation that $$\Delta DR = \Delta DR_1 \times \beta_R^2 + \Delta DR_R$$

and therefore, the combined exit pupil position and the combined best image plane and/or the combined aberration state of the combined system of the interchangeable photo-taking lens and the rear conversion lens are found by calculation and corrected and accurate focus detection can be accomplished, and the accuracy of focus detection can be enhanced, and when the combined exit pupil position is used, focus detection and/or exposure can be accomplished, and the accuracy of focus detection and/or exposure can be enhanced. Also, the fact that the aberration state $\Delta DR$ and exit pupil position PO' of the combined system of the interchangeable photo-taking lens and the rear conversion lens are found by calculation means that it is not necessary to store all aberration states $\Delta DR$ and exit pupil positions PO' of the combinations of various interchangeable photo-taking lenses and the rear conversion lens as information as in the prior art and therefore, the memory capacity for data can be greatly reduced and a reduction in cost can also be achieved.

We claim:

1. A system camera including:
   a camera body having a focus detecting apparatus for detecting the amount of deviation of the image plane, and a first converting device for correcting the amount of deviation of the image plane detected by said focus detecting apparatus;
   an interchangeable photo-taking lens barrel disposed forwardly of said camera body and having an interchangeable photo-taking lens and first memory means for storing therein data regarding the exit pupil position PO from the focal plane of said interchangeable photo-taking lens;
   a rear conversion lens barrel interposed between said interchangeable photo-taking lens barrel and said camera body and having a rear conversion lens and second memory means for storing therein data regarding the magnification $\beta_R$ and focal length $f_R$ of said rear conversion lens; and
   a second converting device for reading the data of said first and second memory means and calculating the combined exit pupil position PO' from the focal plane of the combined system of said rear conversion lens and said interchangeable photo-taking lens from the equation that $$1/PO' = 1/(PO \times \beta_R^2) - 1/(f_R \times \beta_R);$$

said second converting device being connected to said first converting device and outputting the calculated combined exit pupil position PO' to said first converting device.

2. An interchangeable photo-taking lens barrel including:
   an interchangeable photo-taking lens;
   first memory means for storing therein data regarding the exit pupil position PO from the focal plane of said interchangeable photo-taking lens;
   mounting means for mounting said interchangeable photo-taking lens barrel on an assembly of a camera body and a rear conversion lens barrel;
   said assembly having a focus detecting apparatus for detecting the amount of deviation of the image plane, a first converting device for correcting the amount of deviation of the image plane detected by said focus detecting apparatus, a rear conversion lens, and second memory means for storing therein data regarding the magnification $\beta_R$ and focal length $f_R$ of said rear conversion lens;
   a second converting device for reading the data of said first and second memory means and calculating the combined exit pupil position PO' from the focal plane of the combined system of said rear conversion lens and said interchangeable photo-taking lens from the equation that $$1/PO' = 1/(PO \times \beta_R^2) - 1/(f_R \times \beta_R); \text{ and}$$

connecting means for connecting said second converting device to said first converting device to output the combined exit pupil position PO' calculated by said second converting device to said first converting device of said assembly.

3. An interchangeable photo-taking lens barrel including:
   an interchangeable photo-taking lens;
   first memory means for storing therein data regarding the exit pupil position PO from the focal plane of said interchangeable photo-taking lens; and
   mounting means for mounting said interchangeable photo-taking lens barrel on an assembly of a camera body and a rear conversion lens barrel;
   said assembly having a focus detecting apparatus for detecting the amount of deviation of the image plane, a first converting device for correcting the amount of deviation of the image plane detected by said focus detecting apparatus, a rear conversion lens, second memory means for storing therein data regarding the magnification $\beta_R$ and focal length $f_R$ of said rear conversion lens, a second converting device for reading the data of said first and second memory means and calculating the combined exit pupil position PO' from the focal plane of the combined system of said rear conversion lens and said interchangeable photo-taking lens from the equation that $$1/PO' = 1/(PO \times \beta_R^2) - 1/(f_R \times \beta_R),$$

and connecting means for connecting said second converting device to said first converting device to output the combined exit pupil position PO' calculated by said second converting device to said first converting device.

4. A rear conversion lens barrel including:
   a rear conversion lens;
   second memory means for storing therein data regarding the magnification $\beta_R$ and focal length $f_R$ of said rear conversion lens;
   mounting means for mounting said rear conversion lens barrel between the camera body and the interchangeable photo-taking lens barrel of an assembly comprising a camera body and an interchangeable photo-taking lens barrel;
   said assembly having a focus detecting apparatus for detecting the amount of deviation of the image plane, a first converting device for correcting the amount of deviation of the image plane detected by said focus detecting apparatus, an interchangeable photo-taking lens and first memory means for storing therein data regarding the exit pupil position PO from the focal plane of said interchangeable photo-taking lens;
   a second converting device for reading the data of said first and second memory means and calculating the combined exit pupil position PO' from the focal plane of the combined system of said rear conversion lens and said interchangeable photo-taking lens from the equation that $$1/PO' = 1/(PO \times \beta_R^2) - 1/(f_R \times \beta_R); \text{ and}$$

connecting means for connecting said second converting device to said first converting device to output the combined exit pupil position PO' calculated by said second converting device to said first converting device of said assembly.

5. A rear conversion lens barrel including:
   a rear conversion lens;

second memory means for storing therein data regarding the magnification $\beta_R$ and focal length $f_R$ of said rear conversion lens; and mounting means for mounting said rear conversion lens barrel between the camera body and the interchangeable photo-taking lens barrel of an assembly comprising a camera body and an interchangeable photo-taking lens barrel;

said assembly having a focus detecting apparatus for detecting the amount of deviation of the image plane, a first converting device for correcting the amount of deviation of the image plane detected by said focus detecting apparatus, an interchangeable photo-taking lens, first memory means for storing therein sata regarding the exit pupil position PO from the focal plane of said interchangeable photo-taking lens, a second converting device for reading the data of said first and second memory means and calculating the combined exit pupil position PO' from the focal plane of the combined system of said rear conversion lens and said interchangeable photo-taking lens from the equation that $$1/PO' = 1/(PO \times \beta_R^2) - 1/(f_R \times \beta_R).$$

and connecting means for connecting said second converting device to said first converting device to output the combined exit pupil position PO' calculated by said second converting device to said first converting device.

6. A system camera including:

a camera body having a focus detecting apparatus for detecting the amount of deviation of the image plane, and a first converting device for correcting the amount of deviation of the image plane detected by said focus detecting apparatus;

an interchangeable photo-taking lens barrel disposed forwardly of said camera body and having an interchangeable photo-taking lens and first memory means for storing therein data regarding the best image plane and/or the aberration state $\Delta DR_1$ of said interchangeable photo-taking lens;

a rear conversion lens barrel interposed between said interchangeable photo-taking lens barrel and said camera body and having a rear conversion lens and second memory means for storing therein data regarding the magnification $\beta_R$ and the best image plane and/or the aberration state $\Delta DR_R$ of said rear conversion lens; and a second converting device for reading the data of said first and second memory means and calculating the combined best image plane and/or the combined aberration state $\Delta DR$ of the combined system of said rear conversion lens and said interchangeable photo-taking lens from the equation that $$\Delta DR = \Delta DR_1 \times \beta_R^2 + \Delta DR_R;$$

said second converting device being connected to said first converting device and outputting the calculated combined best image plane and/or combined aberration state $\Delta DR$ to said first converting device.

7. An interchangeable photo-taking lens barrel including:

an interchangeable photo-taking lens;

first memory means for storing therein data regarding the best image plane and/or the aberration state $\Delta DR_1$ of said interchangeable photo-taking lens;

mounting means for mounting said interchangeable photo-taking lens barrel on an assembly of a camera body and a rear conversion lens barrel;

said assembly having a focus detecting apparatus for detecting the amount of deviation of the image plane, a first converting device for correcting the amount of deviation of the image plane detected by said focus detecting apparatus, a rear conversion lens and second memory means for storing therein data regarding the magnification $\beta_R$ and the best image plane and/or the aberration state $\Delta DR_R$ of said rear conversion lens;

a second converting device for reading the data of said first and second memory means and calculating the combined best image plane and/or the combined aberration state $\Delta DR$ of the combined system of said rear conversion lens and said interchangeable photo-taking lens from the equation that $$\Delta DR = \Delta DR_1 \times \beta_R^2 + \Delta DR_R; \text{ and}$$

connecting means for connecting said second converting device to said first converting device to output the combined best image plane and/or the combined aberration state $\Delta DR$ calculated by said second converting device to said first converting device of said assembly.

8. An interchangeable photo-taking lens barrel including:

an interchangeable photo-taking lens;

first memory means for storing therein data regarding the best image plane and/or the aberration state $\Delta DR_1$ of said interchangeable photo-taking lens; and mounting means for mounting said interchangeable photo-taking lens barrel on an assembly of a camera body and a rear conversion lens barrel;

said assembly having a focus detecting apparatus for detecting the amount of deviation of the image plane, a first converting device for correcting the amount of deviation of the image plane detected by said focus detecting apparatus, a rear conversion lens, second memory means for storing therein data regarding the magnification $\beta_R$ and the best image plane and/or the aberration state $\Delta DR_R$ of said rear conversion lens, a second converting device for reading the data of said first and second memory means and calculating the combined best image plane and/or the combined aberration state $\Delta DR$ of the combined system of said rear conversion lens and said interchangeable photo-taking lens from the equation that $$\Delta DR = \Delta DR_1 \times \beta_R^2 + \Delta DR_R,$$

and connecting means for connecting said second converting device to said first converting device to output the combined best image plane and/or the combined aberration state $\Delta DR$ calculated by said second converting device to said first converting device.

9. A rear conversion lens barrel including:

a rear conversion lens;

second memory means for storing therein data regarding the magnification $\beta_R$ and the best image plane and/or the aberration state $\Delta DR_R$ of said rear conversion lens;

mounting means for mounting said rear conversion lens barrel between the camera body and the interchangeable photo-taking lens barrel of an assembly comprising a camera body and an interchangeable photo-taking lens barrel;

said assembly having a focus detecting apparatus for detecting the amount of deviation of the image plane, a first converting device for correcting the amount of deviation of the image plane detected by said focus detecting apparatus, an interchangeable photo-taking lens and first memory means for storing therein data regarding the best image plane and/or the aberration state $\Delta DR_1$ of said interchangeable photo-taking lens;

a second converting device for reading the data of said first and second memory means and calculating the combined best image plane and/or the combined aberration state $\Delta DR$ of the combined system of said rear conversion lens and said interchangeable photo-taking lens from the equation that $$\Delta DR = \Delta DR_1 \times \beta_R^2 + \Delta DR_R; \text{ and}$$

connecting means for connecting said second converting device to said first converting device to output the combined best image plane and/or the combined aberration state $\Delta DR$ calculated by said second converting device to said first converting device of said assembly.

10. A rear conversion lens barrel including:

a rear conversion lens;

second memory means for storing therein data regarding the magnification $\beta_R$ and the best image plane and/or the aberration state $\Delta DR_R$ of said rear conversion lens; and mounting means for mounting said rear conversion lens barrel between the camera body and the interchangeable photo-taking lens barrel of an assembly comprising a camera body and an interchangeable photo-taking lens barrel;

said assembly having a focus detecting apparatus for detecting the amount of deviation of the image plane, a first converting device for correcting the amount of deviation of the image plane detected by said focus detecting apparatus, an interchangeable photo-taking lens, first memory means for storing therein data regarding the best image plane and/or the aberration state $\Delta DR_1$ of said interchangeable photo-taking lens, a second converting device for reading the data of said first and second memory means and calculating the combined best image plane and/or the combined aberration state $\Delta DR$ of the combined system of said rear conversion lens and said interchangeable photo-taking lens from the equation that $$\Delta DR = \Delta DR_1 \times \beta_R^2 + \Delta DR_R,$$

and connecting means for connecting said second converting device to said first converting device to output the combined best image plane and/or the combined aberration state $\Delta DR$ calculated by said second converting device to said first converting device.

11. A system camera including:

an interchangeable photo-taking lens barrel disposed forwardly of a camera body and having an interchangeable photo-taking lens and first memory means for storing therein data regarding the exit pupil position PO from the focal plane of said interchangeable photo-taking lens;

a rear conversion lens barrel interposed between said interchangeable photo-taking lens barrel and said camera body and having a rear conversion lens and second memory means for storing therein data regarding the magnification $\beta_R$ and focal length $f_R$ of said rear conversion lens; and a converting device for reading the data of said first and second memory means and calculating the combined exit pupil position PO' from the focal plane of the combined system of said rear conversion lens and said interchangeable photo-taking lens from the equation that $$1/PO' = 1/(PO \times \beta_R^2) - 1/(f_R \times \beta_R).$$

12. An interchangeable photo-taking lens barrel including:

an interchangeable photo-taking lens;

first memory means for storing therein data regarding the exit pupil position PO from the focal plane of said interchangeable photo-taking lens;

mounting means for mounting said interchangeable photo-taking lens barrel on an assembly of a camera body and a rear conversion lens barrel;

said assembly having a rear conversion lens and second memory means for storing therein data regarding the magnification $\beta_R$ and focal length $f_R$ of said rear conversion lens; and a converting device for reading the data of said first and second memory means and calculating the combined exit pupil position PO' from the focal plane of the combined system of said rear conversion lens and said interchangeable photo-taking lens from the equation that $$1/PO' = 1/(PO \times \beta_R^2) - 1/(f_R \times \beta_R).$$

13. An interchangeable photo-taking lens barrel including:

an interchangeable photo-taking lens;

first memory means for storing therein data regarding the exit pupil position PO from the focal plane of said interchangeable photo-taking lens; and mounting means for mounting said interchangeable photo-taking lens barrel on an assembly of a camera body and a rear conversion lens barrel;

said assembly having a rear conversion lens, second memory means for storing therein data regarding the magnification $\beta_R$ and focal length $f_R$ of said rear conversion lens, and a converting device for reading the data of said first and second memory means and calculating the combined exit pupil position PO' from the focal plane of the combined system of said rear conversion lens and said interchangeable photo-taking lens from the equation that $$1/PO' = 1/(PO \times \beta_R^2) - 1/(f_R \times \beta_R).$$

14. A rear conversion lens barrel including:
a rear conversion lens;
second memory means for storing therein data regarding the magnification $\beta_R$ and focal length $f_R$ of said rear conversion lens;
mounting means for mounting said rear conversion lens barrel between the camera body and the interchangeable photo-taking lens barrel of an assembly comprising a camera body and an interchangeable photo-taking lens barrel;
said assembly having an interchangeable photo-taking lens and first memory means for storing therein data regarding the exit pupil position PO from the focal plane of said interchangeable photo-taking lens; and
a second converting device for reading the data of said first and second memory means and calculating the combined exit pupil position PO' from the focal plane of the combined system of said rear conversion lens and said interchangeable photo-taking lens from the equation that $$1/PO' = 1/(PO \times \beta_R^2) - 1/(f_R \times \beta_R).$$

15. A rear conversion lens barrel including:
a rear conversion lens;
second memory means for storing therein data regarding the magnification $\beta_R$ and focal length $f_R$ of said rear conversion lens; and
mounting means for mounting said rear conversion lens barrel between the camera body and the interchangeable photo-taking lens barrel of an assembly comprising a camera body and an interchangeable photo-taking lens barrel;
said assembly having an interchangeable photo-taking lens, first memory means for storing therein data regarding the exit pupil position PO from the focal plane of said interchangeable photo-taking lens, and a second converting device for reading the data of said first and second memory means and calculating the combined exit pupil position PO' from the focal plane of the combined system of said rear conversion lens and said interchangeable photo-taking lens from the equation that $$1/PO' = 1/(PO \times \beta_R^2) - 1/(f_R \times \beta_R).$$

* * * * *